United States Patent [19]

Herron

[11] 4,202,434
[45] May 13, 1980

[54] STABILIZER ASSEMBLY FOR A MINING MACHINE CONVEYOR

[75] Inventor: Charles R. Herron, Russell, Ky.

[73] Assignee: National Mine Service Company, Pittsburgh, Pa.

[21] Appl. No.: 968,016

[22] Filed: Dec. 11, 1978

Related U.S. Application Data

[63] Continuation of Ser. No. 782,181, Mar. 28, 1977, abandoned.

[51] Int. Cl.² ............................................. B65G 21/00
[52] U.S. Cl. .................... 198/316; 198/318; 198/865
[58] Field of Search ............... 198/316, 318, 319, 320, 198/592, 593, 589, 862, 865, 312; 298/17 B

[56] References Cited

U.S. PATENT DOCUMENTS 2,407,012   9/1946   Hutchinson .................... 298/17 B

FOREIGN PATENT DOCUMENTS 1456723   1/1969   Fed. Rep. of Germany ........... 198/318

Primary Examiner—Robert B. Reeves
Assistant Examiner—Douglas D. Watts
Attorney, Agent, or Firm—Stanley J. Price, Jr.; John M. Adams

[57] ABSTRACT

A conveyor assembly extends longitudinally on the body portion of a mining machine. A forward end portion of the conveyor assembly is pivotally connected to the body portion so that a rearward end portion is movable through a vertical arc to facilitate discharge of mined material at a preselected height above the body portion. The rearward end portion is vertically raised and lowered by a piston cylinder assembly that is mounted on the body portion and is connected to the conveyor assembly. Actuation of the piston cylinder assembly positions the conveyor rearward end portion at an elevated position above the body portion. A stabilizing member is positioned between the conveyor assembly and the machine body portion with the upper end portion hingedly connected to the conveyor assembly and the lower end portion positioned for longitudinal movement between vertical sidewalls on the body portion. The lower end portion of the stabilizing member is restrained by the sidewalls from moving laterally on the body portion and thus serves to prevent the conveyor assembly from swaying laterally when positioned at a preselected height above the body portion.

10 Claims, 5 Drawing Figures

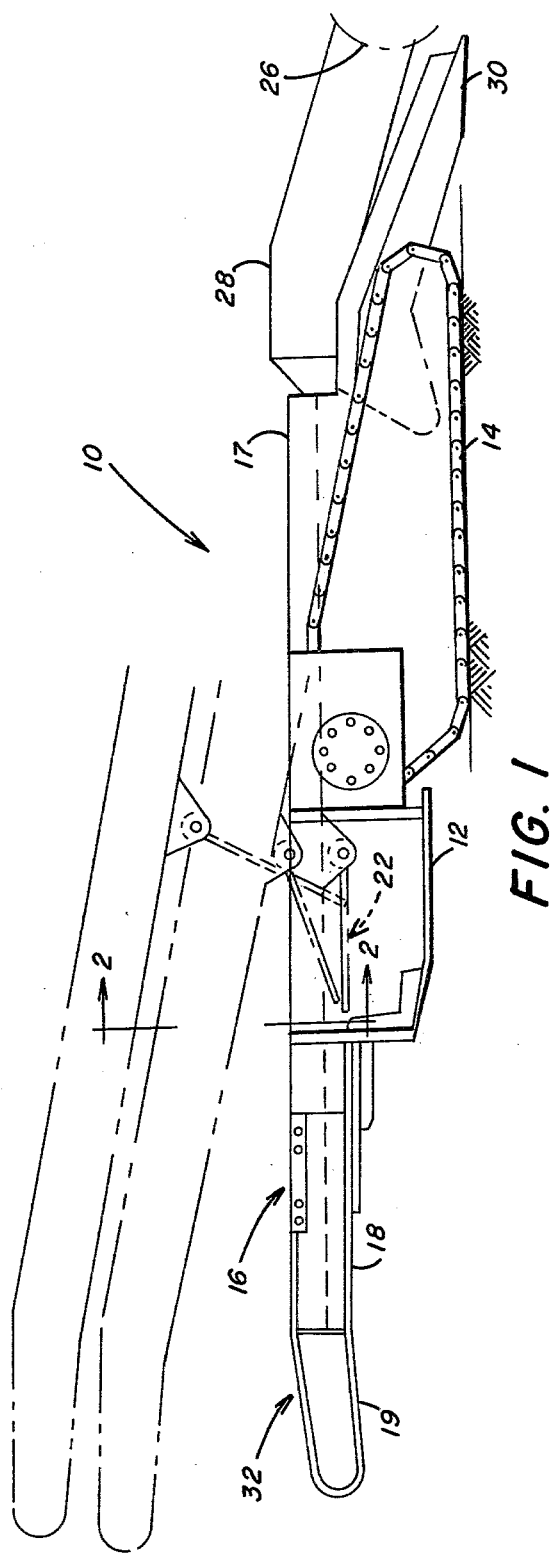
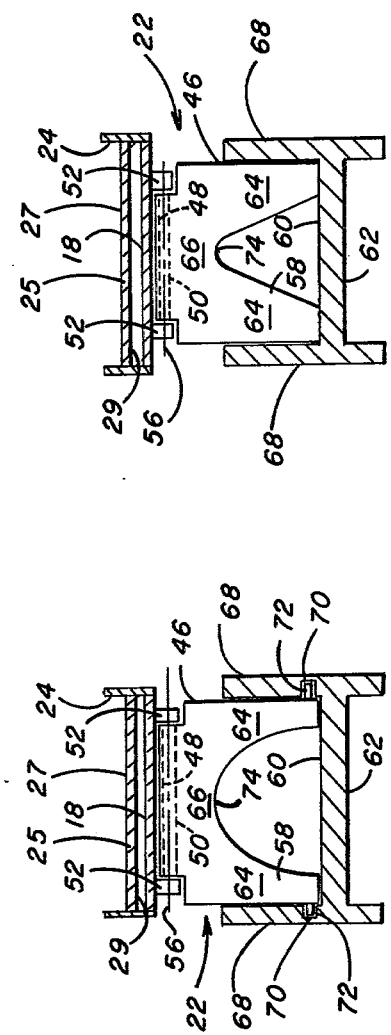
FIG. 1
FIG. 2
FIG. 3

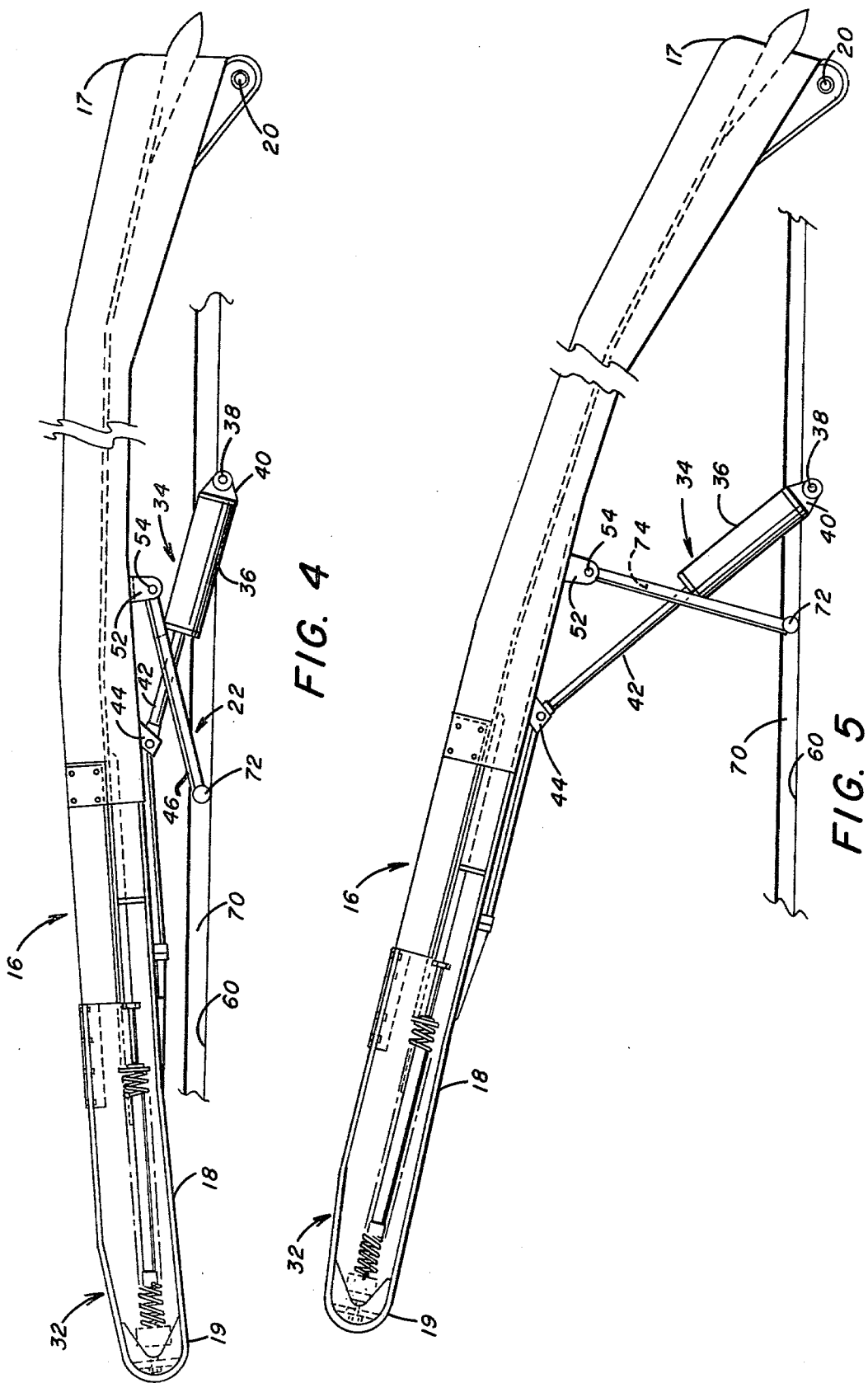

STABILIZER ASSEMBLY FOR A MINING MACHINE CONVEYOR

CROSS REFERENCE TO RELATED APPLICATIONS

This application is a continuation of copending application Ser. No. 782,181 filed on Mar. 28, 1977, entitled "Stabilizer Assembly For A Mining Machine Conveyor" by Charles R. Herron.

BACKGROUND OF THE INVENTION

1. Field of the Invention

This invention relates to a conveyor stabilizer for an underground mining machine and more particularly to a stabilizing member that is hingedly connected to a conveyor assembly and longitudinally movable on the machine body portion to stabilize the conveyor assembly and prevent lateral swaying movement thereof.

2. Description of the Prior Art

In underground mining operations the cutting device of a mining machine is operable to dislodge solid mineral material from the mine face. The dislodged material is moved rearwardly of the cutting device by a gathering device onto the forward or receiving end portion of a conveyor assembly that extends longitudinally on the body portion of the mining machine. The conveyor assembly is pivotally connected at its forward end portion to the machine body portion and includes a discharge end portion that extends rearwardly of the machine body portion. A flexible continuous flight conveyor is supported by the frame of the conveyor assembly and extends rearwardly of the cutting device.

The continuous conveyor is operable to transport the dislodged material to the discharge end portion. The discharge end portion is vertically adjustable relative to the machine body portion by operation of elevation cylinder assemblies and also includes a pivotal section which permits the discharge end portion to swing laterally through an angle of 45° relative to the front end portion of the continuous conveyor. With this arrangement the discharge end portion of the continuous conveyor is maintained in material receiving relation with a material haulage vehicle or conveyor as the mining machine is maneuvered through the mine. By maintaining the discharge end portion in material receiving relation with the haulage vehicle, a continuous mining operation is carried out by the conveyance of the loose material from the mine face.

The conveyor assembly is supported at a preselected height by the elevation cylinders with a substantial portion of the discharge end portion extending unsupported from the rearward end of the mining machine. The elevation cylinders are pivotally connected at one end portion to the machine body portion and at the opposite end portion to the conveyor frame. Extension and retraction of the elevation cylinder assemblies pivots the conveyor assembly about its pivotal connection to the machine body portion to raise and lower the discharge end portion through a substantially vertical arc. Once the discharge end portion has been raised to a preselected height, the cylinders maintain this position as the continuous conveyor mechanism is operated to transfer the mined material from the receiving end portion to the discharge end portion and therefrom into the haulage vehicle.

Consequently, with this arrangement, particularly during tramming of the machine, the overall stability of the conveyor is reduced to the extent that the conveyor is subject to undesirable swaying movement resulting in spillage of the mined material over the sideboards of the conveyor. Therefore, a problem is presented in restraining the conveyor assembly from swaying laterally above the machine body portion.

There is need to provide apparatus on a mining machine that stabilizes the mining machine conveyor to ensure that the conveyor is restrained from swaying laterally when the conveyor assembly is raised and lowered and when the machine is trammed.

SUMMARY OF THE INVENTION

In accordance with the present invention there is provided a conveyor stabilizer for an underground mining machine that includes a body portion and a conveyor assembly having a forward end portion and a rearward end portion. The conveyor assembly extends longitudinally above the body portion with the forward end portion being pivotally connected to the body portion. A stabilizing member is positioned between the conveyor assembly and the body portion. A pivot mechanism pivotally connects the stabilizing member at one end portion to the conveyor assembly. The stabilizing member is positioned at the opposite end portion on the body portion to restrain the conveyor assembly from lateral swaying movement above the body portion.

An extensible device, such as a piston cylinder assembly, is pivotally connected at the base portion to the machine body portion in underlying relation with the conveyor assembly. A piston rod extends outwardly from the piston cylinder assembly and is connected by a universal joint to the lower surface of the conveyor frame. The pivotal connection of the piston rod to the conveyor assembly is adjacent the pivotal connection of the stabilizing member to the conveyor assembly. With the piston rod in a retracted position within the piston cylinder assembly the conveyor assembly is maintained at a lowermost position on the body portion. The piston cylinder assembly maintains the conveyor assembly at a preselected vertical height above the body portion; while the stabilizing member serves to rigidify the conveyor assembly on the body portion to restrain the conveyor assembly from swaying laterally, particularly during tramming of the mining machine.

Upon actuation of the piston cylinder assembly the rod is extended therefrom to vertically raise the conveyor assembly about its pivotal connection at the forward end portion to the machine body portion. As the conveyor assembly pivots upwardly the discharge end portion is raised through a vertical arc. Also, the stabilizing member pivots at its upper end portion about the hinged connection to the conveyor assembly and the lower end portion of the stabilizing member slides longitudinally on the horizontal surface of the machine body portion. The body portion includes a pair of spaced parallel, vertically extending sidewalls. The stabilizing member is positioned between the sidewalls with the lateral edges of the stabilizing member closely adjacent to the sidewalls. With this arrangement, the sidewalls maintain longitudinal movement of the stabilizing member lower end portion on the machine body portion. This serves to confine the conveyor assembly to vertical pivotal movement when raised and lowered and to prevent undesirable lateral swaying movement of the conveyor assembly.

The upper end portion of the stabilizing member, which may include an elongated plate member, is hingedly connected to the lower surface of the conveyor assembly about a horizontal pivotal axis. A pin member extends through a bore of a rolled portion at the upper end portion of the plate member with the end portions of the pin member retained in brackets extending downwardly from the conveyor assembly. The lower end portion of the plate member is slidable on the upper horizontal surface of the body portion frame.

When the piston rod of the piston cylinder assembly is fully retracted, the conveyor assembly is positioned substantially horizontal on the body portion, and the stabilizing plate approaches a horizontal position. With the piston rod fully extended the conveyor assembly is pivoted upwardly, and the stabilizing plate approaches a vertical position. Thus, as the conveyor assembly is pivoted upwardly, the stabilizing plate prevents the conveyor assembly from swaying laterally above the body portion. As the conveyor assembly is raised and lowered the stabilizing plate serves to maintain movement of the rearward end portion through an arcuate vertical path.

In one embodiment the stabilizing member is slidably retained at the lower end portion in longitudinal slots in vertical sidewalls of the machine body portion. A pair of pin members or rollers extending laterally of the stabilizing member are positioned within the longitudinal slots. This arrangement maintains longitudinal movement of the stabilizing member on the body portion so that the conveyor assembly moves only vertically and is restrained from lateral swaying movement.

Accordingly, the principal object of the present invention is to provide apparatus for stabilizing a conveyor assembly for an underground mining machine at a preselected pivoted height above the machine and as the conveyor assembly is pivoted upwardly and downwardly.

Another object of the present invention is to provide for a mining machine conveyor assembly a stabilizing member that is pivotally connected to the conveyor assembly and movable on the machine body portion for restraining the conveyor assembly from undesirable lateral swaying movement on the mining machine.

A further object of the present invention is to provide a stabilizing member for a conveyor assembly that is pivotally connected at the forward end portion to the body portion of a mining machine for movement of the rearward end portion through an arcuate vertical path with stabilizing member hinged to the conveyor assembly and movable on the body portion to restrain the conveyor assembly from lateral swaying movement as it is raised and lowered.

These and other objects of the present invention will be more completely described and disclosed in the following specification, the accompanying drawings and the appended claims.

BRIEF DESCRIPTION OF THE DRAWINGS

FIG. 1 is a fragmentary view in side elevation of a conveyor assembly of a mining machine, illustrating a stabilizer assembly pivotally connected to the conveyor and supported for longitudinal movement on the mining machine for supporting the end of the conveyor assembly at a preselected vertical height.

FIG. 2 is a sectional end view of the conveyor assembly taken along line 2—2 of FIG. 1, illustrating the stabilizer assembly hingedly connected to the conveyor assembly and positioned for longitudinal movement on the mining machine frame.

FIG. 3 is a view similar to FIG. 2, illustrating another embodiment of the stabilizer assembly.

FIG. 4 is a fragmentary view in side elevation of the conveyor assembly, illustrating the connection of the stabilizer assembly to the conveyor assembly and the mining machine frame for stabilizing the conveyor assembly in a tramming position on the mining machine.

FIG. 5 is a view similar to FIG. 4, illustrating the stabilizer assembly in an elevated position.

DESCRIPTION OF THE PREFERRED EMBODIMENTS

Referring to the drawings, and particularly to FIG. 1, there is illustrated a mining machine generally designated by the numeral 10 that has a body or frame portion 12 mounted on propelling devices 14, such as endless crawler tracks. Suitable motors are provided to propel the mining machine 10 on the endless crawler tracks 14 and advance the mining machine during the mining operation. A laterally flexible conveyor assembly, generally designated by the numeral 16 extends longitudinally on the body portion 12 and includes a frame portion 18 for supporting an endless conveyor mechanism. As illustrated in FIGS. 4 and 5 the support frame 18 includes a forward end portion 17 and a rearward end portion 19 with the forward end portion having a pivot point 20 for connecting the frame 18 to the body portion 12 about a horizontal pivot. With this arrangement the rearward end portion 19 of the support frame 18 is raised and lowered through a pivotal arc about the pivot point 20.

The rearward end portion 19 of the conveyor support frame 18 is stabilized to prevent lateral swaying movement by a conveyor stabilizing mechanism generally designated by the numeral 22 that is hingedly connected at one end portion to the support frame 18 and is positioned for slidable longitudinal movement at the opposite end portion on the body portion 12. The conveyor support frame 18 has a U-shaped configuration and forms a longitudinal trough 24. A longitudinally extending plate 25 is positioned between the sidewalls of the frame 18 above the floor of the trough 24. The plate 25 has upper and lower horizontal surfaces 27 and 29. An endless conveyor mechanism, such as a flight-type chain conveyor (not shown), surrounds the plate 25 with the upper conveyor reach positioned on surface 27 and the lower conveyor reach positioned on surface 29. The endless conveyor is driven in a direction from the forward end portion to the rearward end portion of the conveyor to convey dislodged material rearwardly on plate 25. Material dislodging apparatus 26, such as a cutter drum, is rotatably mounted on the front of a boom member 28 that is pivotally connected to the mining machine body portion 12.

Solid material dislodged from the mine face by the cutting action of the cutter drum 26 is gathered from the mine floor by a gathering device 30 that extends forwardly from the body portion 12. The gathering device 30 gathers the dislodged material and feeds the material rearwardly into the conveyor trough 24 onto the upper surface 27 of plate 25 at the receiving end portion of the conveyor mechanism. The dislodged material is then conveyed rearwardly on the conveyor assembly 16 to a discharge end portion generally designated by the numeral 32. U.S. Pat. No. 3,774,969 discloses in greater detail the operation of the mining machine 10 in dislodging solid material from a mine face.

The conveyor support frame 18 at the discharge end portion 32 includes a conveyor boom that is arranged to swing laterally in a preselected direction by operation of piston cylinder assemblies (not shown). The conveyor boom rotatably supports the discharging end portion of the endless conveyor mechanism. The opposite end portion of the conveyor mechanism is rotatably supported at the forward end portion 17 of the conveyor support frame 18. A suitable conveyor drive motor is mounted on the machine body portion 12 and is drivingly connected to the discharge end portion of the conveyor mechanism to rotate the conveyor in a direction from the forward end portion 17 to the rearward end portion 19. The dislodged material is fed by the gathering device 30 onto the receiving end portion of the conveyor mechanism and is advanced rearwardly within the trough 24 from the forward end portion 17 to the rearward end portion 19 on the conveyor support frame 18. The dislodged material is transferred from the discharge end portion 32 onto a conventional section belt or into a suitable haulage vehicle for removal of the dislodged material from the mine.

Not only is the conveyor assembly 16 pivotal laterally about a vertical axis, it is also movable through a vertical arc about a horizontal axis at the pivot point 20 by operation of an extensible device generally designated by the numeral 34 in FIGS. 4 and 5. The extensible device 34 includes a piston cylinder assembly 36 that is pivotally connected by a pin 38 extending through a clevis connection 40 to the machine body portion 12. The piston cylinder assembly 36 includes an extensible rod 42 that is connected by a universal joint 44 to the conveyor support frame 18. With the assembly 36 pivotally connected to the machine body portion 12, actuation of the assembly 36 to extend the rod 42 raises the discharge end portion 32 of the conveyor assembly 16 upwardly through a vertical arc. As the rod 42 extends to its full length from the assembly 36, the assembly 36 also pivots upwardly about the clevis connection 40 as illustrated in FIG. 5. With this arrangement the discharge end portion 32 is vertically adjustable above the body portion 12. A single piston cylinder assembly 36, positioned between the conveyor assembly 16 and the body portion 12, is illustrated in the figures; however, more than one may be provided for adjusting the elevation of the discharge end portion 32 above the machine body portion.

Preferably, the assembly 36 and the rod 42 are connected to the body portion 12 and the conveyor support frame 18 on the longitudinal axis thereof to provide for upward and downward movement of the conveyor assembly 16 through a vertical arc. With this above described arrangement the conveyor discharge end portion 32 is raised to a preselected vertical height above the machine body portion 12 for discharging the dislodged material onto a section belt or into a suitable haulage vehicle. By pivotally connecting the conveyor support frame 18 to the body portion 12 and through operation of the piston cylinder assembly 36, the discharge end portion 32 is maintained in overlying relation with the section belt or haulage vehicle to ensure uninterrupted transfer of the dislodged material from the mining machine 10 for haulage out of the mine.

Once the discharge end portion 32 of the conveyor assembly 16 is raised to a preselected height above the machine body portion 12 by the extension of the rod 42, the conveyor assembly 16 is restrained from undesirable lateral swaying movement by the conveyor stabilizer 22 that is positioned between the conveyor support frame 18 and the machine body portion 12. The conveyor stabilizer 22 includes a stabilizing member 46, such as a plate as illustrated in FIGS. 1–5 or the stabilizing member may include other configurations such as a prop, support, jack, or the like. The preferred embodiment of the stabilizing member 46 is illustrated in the FIGS. 2 and 3 and includes an elongated body portion having vertical sides and a rolled upper end portion 48 with a bore 50 extending transversely therethrough. A pair of brackets 52 having bores therethrough are secured to and extend downwardly in spaced relation from the lower surface of the conveyor support frame 18. The stabilizing member 46 is positioned beneath the support frame 18 so that the rolled end portion 48 is positioned between the brackets 52 with the bore 50 aligned with the respective bores of the brackets 52. An elongated pin 54 extends through the aligned bores of the stabilizing member end portion 48 and the brackets 52. With this arrangement the stabilizing member 46 is hingedly connected to the lower surface of the conveyor support frame 18 to pivot about a horizontal axis 56.

The body portion of the stabilizing member 46 extends downwardly from the hinged connection to the conveyor support frame 18, and a lower end portion 58 of the member 46 is positioned on horizontal surface 60 of a frame 62 of the machine body portion 12. As illustrated in FIGS. 2 and 3, the stabilizing member 46 includes a pair of spaced leg portions 64 that are joined at their upper end portion by a transverse body portion 66. The frame 62 of the machine body portion 12 includes a pair of spaced parallel vertical sidewalls 68 that extend upwardly from the horizontal surface 60. The member 46 is positioned between the sidewalls 68 on the surface 60 with the sides of the member 46 positioned parallel and closely adjacent to the sidewalls 68. With this arrangement the sidewalls 68 restrain the member 46 from moving laterally on the frame 62 as the member 46 moves longitudinally.

In the embodiment of FIG. 2 each of the sidewalls 68 includes a guide means such as a longitudinally extending slot or recess 70 that extends for a suitable length on the frame 62. A retaining device such as a pin member 72 is secured to and extends outwardly from each leg portion 64 of the end portion 58. The pin members 72 extend into the longitudinal slots 70 and are longitudinally slidable therein. This arrangement maintains longitudinal movement of the stabilizing member 46 on surface 60 as the member 46 pivots about the upper end portion 48 upon extension and retraction of the rod 42.

As the conveyor assembly 16 is raised from the position illustrated in FIG. 4 to the position illustrated in FIG. 5 by actuation of the piston cylinder assembly 36, the lower end portion 58 of the stabilizing member 46 advances longitudinally on the frame 62. The adjacent sidewalls 68 of frame 62 prevent the stabilizing member 46 from moving laterally on the frame 62. This ensures movement of the conveyor discharge end portion 32 in an arcuate vertical path preventing lateral swaying movement of the conveyor assembly 16 as it is raised and lowered. Also, when the assembly 16 has been elevated to a preselected height, the member 46 stabilizes the assembly 16, preventing lateral swaying movement thereof.

Further in accordance with the present invention, as illustrated in FIG. 3, the leg portions 64 of the stabilizing member 46 are positioned on the horizontal surface 60 of the frame 62 without the addition of the pins 72 and the longitudinal slots 70 in the frame sidewalls 68. As with the embodiment illustrated in FIG. 2, the stabilizing member 46 is slidably positioned on the horizontal surface 60 and the sides of member 46 are positioned closely adjacent to the frame sidewalls 68. As the rod 42 extends and retracts, the stabilizing member leg portions 64 translate longitudinally on the horizontal surface 60 with the sidewalls 68 restraining the member 46 from lateral movement.

Once the conveyor discharge end portion 32 is raised to a preselected vertical height above the body portion 12, the piston cylinder assembly 34 maintains the conveyor assembly 16 in an elevated position, as illustrated in FIG. 5. The stabilizing member 46 stabilizes the assembly 16 and prevents the assembly 16 from moving laterally. The member 46 also functions to stabilize the conveyor assembly 16 when positioned in a lowermost position, as illustrated in FIG. 4, during tramming of the mining machine 10. Thus, the stabilizing member 46, as illustrated in FIGS. 2 and 3, serves to laterally support the conveyor assembly 16 when positioned at a preselected vertical height and thereby prevent the assembly from swaying laterally. This is accomplished when the assembly 16 is pivoted to the maximum height, as illustrated in FIG. 5, or to a position on the mining machine 10 for tramming, as illustrated in FIG. 4.

The leg portions 64 of the stabilizing member 46 are preferably spaced apart to form an opening 74 through which the piston cylinder assembly 36 and the piston rod 42 extend. The piston cylinder assembly 36 is secured to the machine body portion 12 to centrally position the assembly between the leg portions 64 within the opening 74. As illustrated in FIG. 4, when the conveyor assembly 16 is maintained in a lowermost position, the rod 42 is fully retracted and the conveyor assembly is positioned in substantially a horizontal position on the body portion 12. In this position the lower end portion 58 is extended forwardly of the horizontal pivotal axis 56 about which the rolled end portion 48 pivots to form an acute angle with the horizontal surface 60 of frame 62.

Extension of the rod 42 from the assembly 36 urges the conveyor assembly 16 to pivot upwardly about pivot point 20 and move the conveyor discharge end portion 32 through an arcuate vertical path. As the rod 42 extends, the lower end portion 58 of the stabilizing member 46 advances on the horizontal surface 60 toward the horizontal pivotal axis 56. With the embodiment of the stabilizing member 46 illustrated in FIG. 2, the lower end portion 58 is guided by the movement of the pins 72 within the longitudinal slots 70. The stabilizing member 46 laterally supports the conveyor support frame 18 as it is pivoted upwardly and thereby prevents undesirable lateral movement of the support frame 18. When the rod 42 is fully extended the stabilizing member 46 approaches a vertical position on the frame 62; however, the member 46 is positioned so that the lower end portion 58 remains forward of the horizontal pivotal axis 56. Thus, the stabilizing member 46 is positioned at an acute angle with the horizontal surface 60 of the frame 62. As the conveyor assembly 16 moves between the lowermost position illustrated in FIG. 4 and the uppermost position illustrated in FIG. 5, the stabilizing member 46 moves through an acute angle relative to the surface 60 so at either position, illustrated in FIGS. 4 and 5, the stabilizing member 46 is positioned at an acute angle with surface 60.

According to the provisions of the patent statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

I claim:

1. A conveyor stabilizer for an underground mining machine comprising, a mining machine body portion, a conveyor assembly having a forward end portion and a rearward end portion, said conveyor assembly extending longitudinally above said mining machine body portion with said forward end portion being pivotally connected to said mining machine body portion, a stabilizing member positioned between said conveyor assembly and said body portion, said stabilizing member having a first end portion and a second end portion, pivot means for pivotally connecting said first end portion of said stabilizing member to said conveyor assembly, restraining means to restrain lateral movement of said stabilizing member, said restraining means including a body portion positioned longitudinally on said mining machine body portion and extending in underlying relation with said conveyor assembly, said restraining means body portion having a pair of spaced, parallel vertically extending sidewalls, said stabilizing member second end portion being adapted for longitudinal movement on said restraining means, said stabilizing member having lateral edges positioned between and closely adjacent to said pair of spaced, parallel vertically extending sidewalls respectively of said restraining means, said pair of spaced, parallel vertically extending sidewalls extending a distance upwardly and oppositely of said stabilizing member lateral edges to restrain said stabilizing member from moving laterally and to permit said stabilizing member to move longitudinally between said sidewalls, and said stabilizing member being supported by said restraining means on said mining machine body portion to restrain said conveyor assembly from lateral swaying movement above said mining machine body portion and thereby rigidify said conveyor assembly.

2. A conveyor stabilizer for an underground mining machine as set forth in claim 1 in which, said first end portion of said stabilizing member includes a transverse bore extending therethrough, pivot support means extending downwardly from said conveyor assembly, and said pivot means including an elongated pin member arranged to pass through said transverse bore of said stabilizing member with the end portions of said pin member being supported by said pivot support means to hingedly connect said stabilizing member first end portion to said conveyor assembly.

3. A conveyor stabilizer for an underground mining machine as set forth in claim 1 which includes,
said first end portion of said stabilizing member is connected to said conveyor assembly by said pivot means for pivotal movement about an axis horizontal to said conveyor assembly, and
said stabilizing member second end portion positioned closely adjacent to said pair of spaced sidewalls for longitudinal movement on said restraining means body portion.

4. A conveyor stabilizer for an underground mining machine as set forth in claim 1 which includes,
extensible means connected at one end to said mining machine body portion and at the opposite end to said conveyor assembly,
said extensible means being operable to raise and lower said conveyor assembly about the pivotal connection of said conveyor assembly to said body portion to position said conveyor assembly rearward end portion at a preselected height above said mining machine body portion, and
said stabilizing member second end portion being positioned for longitudinal movement relative to said restraining means to maintain movement of said conveyor assembly through an arcuate vertical path.

5. A conveyor stabilizer for an underground mining machine as set forth in claim 4 in which said extensible means includes,
a piston cylinder assembly having a base portion pivotally connected to said body portion,
a rod extending outwardly from the upper end portion of said piston cylinder assembly,
means for pivotally connecting said rod to said conveyor assembly, and
said piston cylinder assembly being operable upon actuation to extend said rod to raise said conveyor rearward end portion to a preselected height above said mining machine body portion with said stabilizing member being operable to prevent lateral swaying movement of said conveyor assembly at said preselected height.

6. A conveyor assembly for an underground mining machine as set forth in claim 1 which includes,
said stabilizing member second end portion being positioned on said restraining means body portion rearwardly of the pivotal connection of said stabilizing member first end portion to said conveyor assembly, and
means associated with said restraining means body portion for limiting said stabilizing member second end portion to longitudinal movement on said mining machine body portion.

7. A conveyor assembly for an underground mining machine as set forth in claim 1 which includes,
guide means in said pair of restraining means sidewalls for receiving said second end portion of said stabilizing member to maintain movement of said second end portion in a longitudinal direction on said mining machine body portion.

8. A conveyor assembly for an underground mining machine as set forth in claim 1 which includes,
said stabilizing member extending downwardly from said conveyor assembly to abut said mining machine body portion so that said stabilizing member is positioned at an acute angle with said body portion, and
said stabilizing member being slidably supported on said mining machine body portion to maintain said conveyor assembly rearward end portion movable in an arcuate vertical path above said mining machine body portion between a lowermost position and an uppermost position where said stabilizing member is maintained at an acute angular relation with said body portion.

9. A conveyor assembly for an underground mining machine as set forth in claim 8 which includes,
adjustable means supported by said mining machine body portion and connected to said conveyor assembly for pivoting said conveyor assembly to position said rearward end portion thereof at a preselected height above said body portion.

10. A conveyor stabilizer for an underground mining machine comprising,
a mining machine body portion,
a conveyor assembly having a forward end portion and a rearward end portion,
said conveyor assembly extending longitudinally above said mining machine body portion with said forward end portion being pivotally connected to said mining machine body portion,
a stabilizing member positioned between said conveyor assembly and said body portion,
pivot means for pivotally connecting one end portion of said stabilizing member to said conveyor assembly,
restraining means to restrain lateral movement of said stabilizing member,
said restraining means including a body portion positioned on said mining machine body portion,
said restraining means body portion having a pair of spaced parallel vertical sidewalls,
said stabilizing member having lateral edges positioned between and closely adjacent to said restraining means upwardly extending members,
guide means in said sidewalls for receiving the other end portion of said stabilizing member to maintain movement of said other end portion in a longitudinal direction on said mining machine body portion, and
said stabilizing member positioned in operative relation with said restraining means on said mining machine body portion so that said upwardly extending members prevent said stabilizing member from moving laterally to restrain said conveyor assembly from lateral swaying movement above said mining machine body portion.

* * * * *